(12) United States Patent
Lugo et al.

(10) Patent No.: US 8,449,221 B1
(45) Date of Patent: May 28, 2013

(54) METHOD AND APPARATUS FOR REPAIRING A DAMAGED SECTION OF A SUBSEA PIPELINE

(75) Inventors: Mario R. Lugo, Houston, TX (US); Noel F. Mascarenhas, Houston, TX (US); Ronald W. Downing, Houston, TX (US)

(73) Assignee: Trendsetter Engineering, Inc., Houston, TX (US)

( * ) Notice: Subject to any disclaimer, the term of this patent is extended or adjusted under 35 U.S.C. 154(b) by 330 days.

(21) Appl. No.: 12/871,055

(22) Filed: Aug. 30, 2010

(51) Int. Cl.
*F16L 1/26* (2006.01)

(52) U.S. Cl.
USPC ...... 405/184.3; 405/169; 405/173; 405/184.1

(58) Field of Classification Search
USPC ........... 405/154.1, 158, 169, 170, 173, 184.1, 405/184.3, 184.4
See application file for complete search history.

(56) References Cited

U.S. PATENT DOCUMENTS

| | | | |
|---|---|---|---|
| 3,508,410 A * | 4/1970 | Lynch | 405/190 |
| 5,044,827 A | 9/1991 | Gray et al. | |
| 5,425,599 A | 6/1995 | Hall et al. | |
| 5,458,441 A | 10/1995 | Barry | |
| 5,518,340 A | 5/1996 | Hall et al. | |
| 6,241,424 B1 | 6/2001 | Bath et al. | |
| 7,402,000 B2 * | 7/2008 | Bastesen et al. | 405/170 |
| 2010/0047023 A1 | 2/2010 | Horne | |

OTHER PUBLICATIONS

Rob Martin, INTEC Engineering, Joseph Killeen, BP America, Inc., Bruce Chandler, INTEC Engineering, "Mardi Gras Deepwater Pipeline Reapair System", May 3, 2004, Copyright 2004, Offshore Technology Conference, p. 1-10.*

* cited by examiner

*Primary Examiner* — John Kreck
*Assistant Examiner* — Carib Oquendo
(74) *Attorney, Agent, or Firm* — Egbert Law Offices, PLLC

(57) ABSTRACT

A method for repairing a damaged section of a subsea pipeline has the steps of cutting the damaged section at a first location on the subsea pipeline, cutting the damaged section of the second location on the subsea pipeline, removing the damaged section, affixing a first messenger line assembly to the subsea pipeline at the first location, affixing a second messenger line assembly to the subsea pipeline at a second location, and connecting a jumper line to the first messenger line assembly and to the second messenger line assembly so as to establish a continuous flowway between the first and second locations. Lift frame assemblies are positioned around the subsea pipeline at the first and second locations so as to elevate the subsea pipeline.

9 Claims, 8 Drawing Sheets

METHOD AND APPARATUS FOR REPAIRING A DAMAGED SECTION OF A SUBSEA PIPELINE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus and methods for repairing damaged subsea pipelines. More particularly, the present invention relates to methods and apparatus for repairing damaged sections of subsea pipeline through the use of a remotely-operated vehicle (ROV). It is still a further object of present invention to provide a method and apparatus for repairing a damaged section of a subsea pipeline in which a jumper line can be connected between the subsea pipeline in the space in which the damaged section is removed.

2. Description of Related Art Including Information Disclosed Under 37 CFR 1.97 and 37 CFR 1.98.

Thousand of miles of pipeline lay on the seabed. Modern pipe laying technology permits the installation of pipelines in a variety of water depths, including water depths of thousands of feet. A serious problem results when damage occurs to a pipeline set in deep water because repair can become cumbersome and difficult. Typically, submerged pipelines are damaged by an object impacting the pipeline, by an anchor dragging across the pipeline, or by the environment corroding the pipeline. If a section of pipeline becomes significantly damaged, it can require replacement.

In the past, generally two methods were employed to repair a damaged submerged pipeline. One method required the damaged section of the pipeline to be recovered to the water surface for repair on the dock of a large service vessel. After the repair was completed, the pipeline was lowered and repositioned on the seabed. A disadvantage of this method was the expense associated with recovering the pipeline to the surface. Another disadvantage with this method was that it typically could only be used with small diameter pipelines in relatively shallow water.

A second method for repairing a damage pipeline involved cutting the pipeline into two pieces near the damaged section while the pipeline remained on the seabed. The cut end of each pipe section was pulled to the surface. Once at the surface, the damaged section of pipeline was replaced with a new section. Specially designed connectors gripped the pipe at the cut ends and provided a flange or collet hub that could be used to connect the new section to the pipeline. Often, a third connector was used to make a telescopic spool section that could be expanded between the two cut ends of the pipeline to facilitate the connection. A disadvantage of this method was that the product could escape from the pipeline to the subsea environment and seawater could enter into the pipeline.

To prevent product from escaping into the environment from the cut pipeline, hot tapping systems were used to plug the pipeline. In general, hot tapping systems use a clamp-on, split tee to provide a fluid tight connection in the pipeline. A special drill was attached to the tee in a manner that prevents loss of pipeline fluid during the tapping operation. The tapping drill was fitted with a special cutter that opened a hole in the side of the pipeline. After cutting a hole in the pipeline, a stopper machine replaced the drill. The stopper machine installed an elastomeric stopper into the pipeline. After the new pipeline section was attached to the remaining pipeline, the stopper was removed but the tee became a permanent part of the pipeline.

It is known to use a remotely operated vehicle (ROV) in deep water to sever and recover a submerged pipeline. U.S. Pat. No. 5,044,827, to Gray et al., discloses a method for severing and recovering a submerged pipeline. The ROV jets beneath a portion of the pipeline and then a deflated lift bag is lowered to the submerged pipeline. The deflated lift bag is positioned under the submerged pipeline and then inflated until a section of the pipeline has been raised off the seabed. A cut-off saw is lowered to the raised section of the pipeline. The cut-off saw is clamped to the pipeline prior to severing the pipeline. The cut-off saw is then removed from the severed pipeline. A recovery head is lowered to the raised end of the severed pipeline and, after alignment, is placed in the raised end of the severed pipeline. The recovery head is activated to establish a gripping relationship with the pipeline. A recovery cable is lowered and connected to the recovery head. The recovery cable is retrieved to recover the recovery head and the pipeline to the water surface.

In the past, various patents have issued relating to the repair of subsea pipelines. For example, an early patent was U.S. Pat. No. 3,508,410, issued on Apr. 28, 1970 to R. P. Lynch. This patent describes a submerged pipeline repair system in which an underwater repair chamber is adapted to straddle the submerged pipeline. Supply lines are provided for introducing a pressurized gas to displace any water therein and maintain the supply lines in a dry condition. Separate clamping mechanisms, such as pressure-actuated cylinders and piston, are located externally of the chamber and mounted at each end of a rigid support structure for engaging the pipeline on opposite sides of the chamber to prevent any movement of the pipeline.

U.S. Pat. No. 5,425,599, issued on Jun. 20, 1995 to Hall et al., also shows a method for repairing a submerged pipeline. This method includes the steps of lowering pipe support frames to the seabed and positioning the pipe support frames beneath the subsea pipeline on each side of the damaged pipeline section. The pipe support frames are expanded to elevate the damaged pipeline section. A pair of pipe attachment and receiving assemblies are lowered to the seabed and positioned astride the pipeline on each side of the damaged section of the pipeline. The pipeline is then gripped. Cutting modules are lowered and attached to the pipe attachment and receiving assemblies. The pipeline is cut at each location. A telescoping spool section is lowered to the seabed and docked into the docking modules. The telescoping spool section is expanded until the spool section engages the pipeline ends.

U.S. Pat. No. 5,458,441, issued on Oct. 17, 1995 to D. W. Barry, shows a pipe section for installation into a subsea pipeline. The pipe section provides a length of pipe having a pipe wall and at least a first bearing shoulder projecting circumferentially outward from the pipe wall so that the pipe section can be handled by supporting the pipe section from the first bearing shoulder during installation. The first bearing shoulder also prevents propagation of buckling failure in the subsea pipeline.

U.S. Pat. No. 5,518,341, issued on May 21, 1996 to Hall et al., teaches a pipe support frame for positioning a subsea pipeline. The support frame includes upper and lower skids which are maintained in vertical alignment with one another. The lower skid includes vertical skid members and the upper skid includes matting vertical upper skid members which slidably engage the vertical lower skid members and maintain vertical alignment. Water jacking bags are positioned between the upper and lower skids to alter the elevation of the upper skid. The upper skid includes a pair of parallel beams. A trolley assembly is movably mounted to the pair of parallel beams to adjust the lateral position of the pipeline. A saddle receives the pipeline and is attached the trolley assembly. A threaded drive rod is rotatably mounted between the pair of parallel beams. The threaded drive rod is threadedly engaged with the trolley assembly such that the lateral position of the trolley assembly is controllable by manipulating the threaded drive rod.

U.S. Pat. No. 6,241,424, issued on Jun. 5, 2001 to Bath et al., provides a method and apparatus for repairing submerged pipeline. This method comprises installing a pair of hot tap tees on either side of the damaged section of pipeline, cutting a hole in the pipeline through each hot tap tee, inserting and securing plugging pigs into the pipeline, cutting and removing the damaged section of pipeline, and installing a new section of pipeline. The apparatus includes a plugging pig for use during repair of a damaged pipeline. This plugging pig has a body shaft, a cup seal secured to the body shaft for engaging an interior wall of the pipeline, a cam attached to the exterior of the body shaft, a slip assembly for sliding on the cam and engaging a slip against the pipeline wall, and a control mechanism for engaging and releasing the slip from the wall.

U.S. Patent Publication No. 2010/0047023, filed on Mar. 7, 2007, describes a pipeline repair connector for a subsea pipeline system. The connector includes a connector housing for gripping and sealing the pipeline ends, and an inlet funnel for receipt of at least one of the pipeline ends. The first part of the housing includes a pressurized gripping and sealing arrangement for receipt and gripping of an existing pipeline end in the connector housing. There is a second part of the housing that has a pressurized operated lightweight coupling for receipt and gripping of a replacement pipe in the connector housing. A pressurized alignment ball joint is intermediate between the housing and the ends. All of the components are adapted to be hydraulically pressurized in a mechanically locking position and to provide a seal to the surroundings.

It is an object of the present invention to provide a method and apparatus for repairing a damaged section of subsea pipeline that effectively establishes a fluid pathway in place of the damaged section of pipeline.

It is another object of the present invention to provide a method and apparatus for repairing a damaged section of subsea pipeline which can be carried out by an ROV in a deepwater environment.

It is still another object of the present invention to provide a method and apparatus for repairing a damaged section of subsea pipeline which can be quickly and easily installed.

It is a further object of the present invention to provide a method and apparatus for repairing a damaged section of subsea pipeline that effectively prevents leakage of pipeline fluid during the repair procedures.

These and other objects and advantages of the present invention will become apparent from a reading of the attached specification and appended claims.

BRIEF SUMMARY OF THE INVENTION

The present invention is a method for repairing a damaged section of a subsea pipeline comprising the steps of: (1) cutting the damaged section at a first location on the subsea pipeline; (2) cutting the damaged section at a second location on the subsea pipeline; (3) removing the damaged section from the subsea pipeline; (4) affixing a first messenger line assembly to the subsea pipeline at the first location; (5) affixing a second messenger line assembly to the subsea pipeline at the second location, and (6) fastening a jumper line to the first messenger line assembly and to the second messenger line assembly.

The method of the present invention further includes placing a first lift frame assembly onto the subsea pipeline at the first location, grasping the subsea pipeline by the first lift frame assembly, and lifting the subsea pipeline adjacent the first location such that the subsea pipeline is raised above a floor of the sea. A second lift frame assembly is positioned onto the subsea pipeline at the second location. This second lift frame assembly also grasps the subsea pipeline. The subsea pipeline is then lifted adjacent to the second location such that the subsea pipeline is raised above a floor of the sea.

Stoppers are applied into the cut ends of the pipeline at the first and second locations. The stoppers have a hose extending therefrom. The method further includes inflating the stopper so as to close an interior of the pipeline at the first location. Additionally, the method includes inflating the stopper so as to close an interior of the pipeline at the second location. The hose of the stoppers can be cut or removed so as to allow the stoppers to selectively deflate. The deflated stoppers will allow a fluid passageway to be established through the first and second messenger lines and the jumper between the cut ends of the subsea pipeline.

The first messenger line assembly is lowered toward the first location of the subsea pipeline. The second messenger line assembly is lowered to the second location of the subsea pipeline. The first lift frame assembly is placed on to the subsea pipeline at the first location. This first messenger line assembly has a yoke connected to an actuator. The messenger line assembly has a grip seal connector connected to a pipe. The yoke is positioned over the grip seal connector. The actuator is suitably actuated so as to draw the yoke so as to pull the grip seal connector over the subsea pipeline at the first location. The first messenger line assembly has a connector at one end thereof. The second messenger line assembly also has a connector at one end thereof. One end of the jumper is affixed to the connector at the one end of the first messenger line assembly. An opposite end of the jumper is affixed to the connector at the end of the second messenger line assembly such that a continuous flow line is established between the first and second locations of the subsea pipeline. Each of the first and second messenger line assemblies has an access opening and a valve. The valve can be closed or open so as to prevent fluid from flowing outwardly during the installation process.

The method of the present invention further includes forming the first lift frame assembly and the second lift frame assembly so that a frame is secured to a base and extends upwardly therefrom. The frame has a clamp extending downwardly from the frame. This clamp is suitable for extending around a portion of the outer diameter of the subsea pipeline. The clamp has an actuator connected thereto suitable for moving the clamp upwardly or downwardly. A first guide shoe and a second guide shoe are affixed in spaced relation to each other. The first guide shoe and a second guide shoe allow this subsea pipeline to extend therebetween.

Each of the first and second messenger line assemblies is formed so as to have a bottom plate with a frame extending upwardly therefrom. The frame supports a pipe and a grip seal connector. The grip seal connector is connected to the pipe at one end thereof. The grip seal connector has an end with a diameter suitable for fitting over the subsea pipeline at the first location. The pipe has a connector at an end opposite the grip seal connector. A yoke and an actuator are connected to the frame. The yoke has an opening suitable for allowing the yoke to be positioned over the grip seal connector. The yoke and actuator are movable between a first position spaced away from the subsea pieline and a second position overlying the subsea pipeline. The first and second lift frame assemblies can be suitably released from the subsea pipeline and removed for use in other locations.

The present invention is also an apparatus for repairing a damaged section of a subsea pipeline. This apparatus includes a base suitable for resting on a sea floor, a frame extending upwardly from the base, a clamp connected to the frame, and a first actuating means connected to the clamp for moving the clamp upwardly so as to allow the clamp to lift the subsea pipeline above the sea floor.

A first guide shoe and a second guide shoe are connected to the frame in spaced relation to each other. The first and second guide shoes are suitable for allowing the subsea pipeline to be positioned therebetween. The guide shoes assure the centering of the frame over the subsea pipeline such that the clamp can properly grip the pipeline.

In the apparatus of the present invention, the messenger line assembly has a grip seal connector at one end thereof and a pipe at an opposite end thereof. The grip seal connector is suitable for fitting over the subsea pipeline. The messenger line assembly includes a base plate and a frame structure affixed to the base plate. The frame structure serves to support the pipe and the grip seal connector a desired distance thereabove. The grip seal connector has a flange formed therearound. A yoke and an actuator are connected to the frame structure. The actuator serves to move the yoke longitudinally. The yoke has an opening formed therein. This opening has a size suitable for allowing the subsea pipeline extend therethrough. The actuator and the yoke are pivotable between a first position in which the yoke is spaced away from the subsea pipeline in a second position in which the yoke overlies the subsea pipeline. The opening of yoke is suitable for extending around the grip seal connector such that yoke abuts a flange of the grip seal connector. The actuator is suitable for moving the yoke so as to cause the grip seal connector to extend around the subsea pipeline.

A jumper has one end affixed to an end of the pipe opposite the hose. The pipe has a vertical portion and a horizontal portion. The jumper has an end connected to the vertical portion of the pipe. The jumper has a generally M-shape with connectors formed at opposite end thereof.

In the present invention, the damaged section of pipeline can be surveyed by an ROV and workers on the surface can review the results. The lift frame assemblies can be prepared on the surface. In particular, the clamp of the lift frame assembly, the guide shoes, and the base can be adapted so as to conform to the damaged section of pipe. The lift frame assemblies can then be launched along the damaged section of the pipeline.

The lift frame assemblies can expose the damaged pipe section by elevating the subsea pipeline. The mechanical and hydraulic functions of the lift frame assemblies can be actuated so as to grab and secure the damaged pipe sections from both sides thereof. The subsea pipeline can be elevated to a pre-determined height.

The ROV can utilize a conventional cutting/cleaning tool so as to cut the pipe in the desired first and second locations. The cut-off section is removed and retrieved to the surface. Any fusion bonded epoxy can be removed from both ends of the cut-out pipe.

The hydraulic stopper is installed in the messenger line assembly with a hose and valve attached thereto. The hydraulic stopper can be inflated with a low pressure/high volume pump (or an accumulator bottle) until no-seepage is observed. The cutting/inclination angle of both ends of the pipe cutting can be suitably surveyed and recorded for proper set up of the messenger line.

The messenger line assembly can be set up at the desired heading/inclination angle at the surface. The messenger line assembly can be placed in a desired location by utilizing a buoy or buoyancy vessel at the top thereof. The messenger line assembly is launched into the water and lowered to the seabed. The messenger line assembly is connected to the subsea pipeline with the hose/valve outside of the hydraulic stopper. The yoke is utilized so as to pull the grip seal connector onto the pipeline.

Once the pipe connection is established between the messenger line assembly and the subsea pipeline, a hose can be connected thereto or cut so as to release the hydraulic stopper. The hydraulic stopper can be pulled out and the valve closed. After installation, the jumper can be suitably measured, constructed and installed. Suitable connectors are formed on the messenger line assembly so as to allow for connection with the jumper. The jumper can be constructed onshore with the measurement data. The ROV can be utilized so as to suitably connect the jumper between the messenger line assemblies so as to establish a fluid connection in the subsea pipeline.

DETAILED DESCRIPTION OF THE INVENTION

Figure 1:
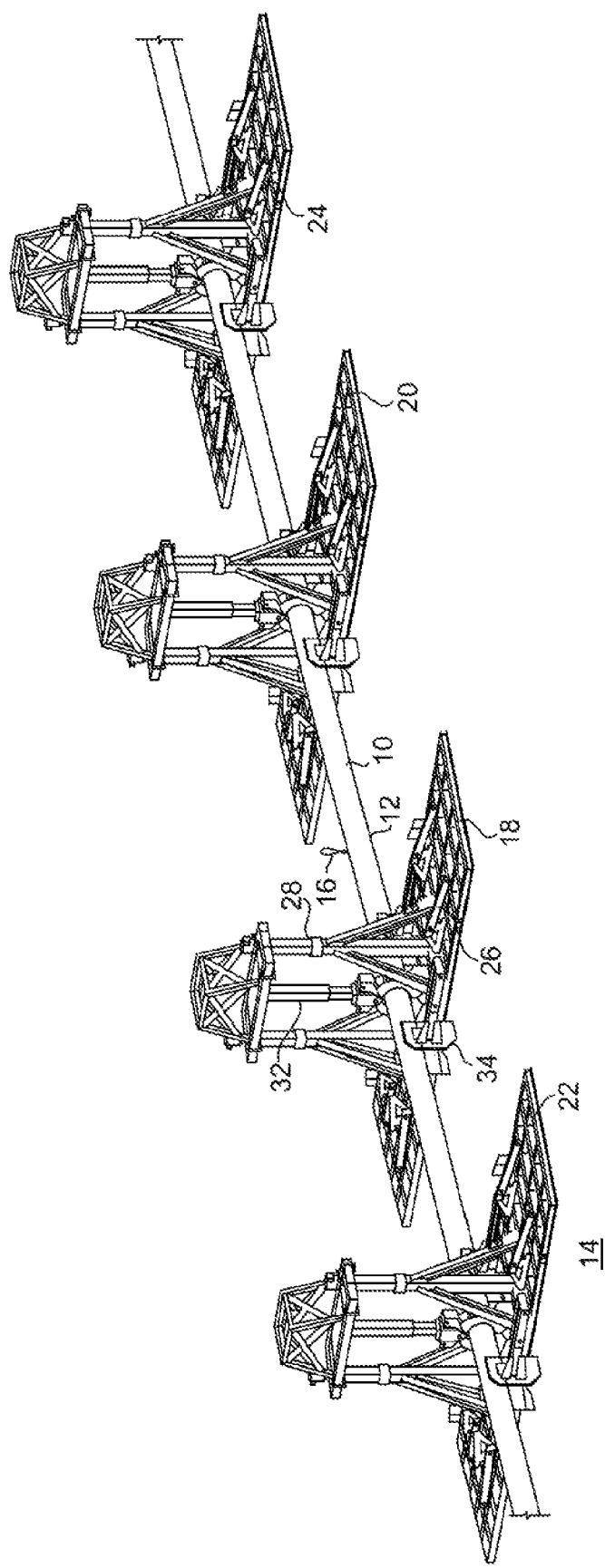
FIG. 1 is a perspective view showing the method of the present invention as utilized for the removal of a damaged section of pipeline.

Referring to FIG. 1, there is shown the first step of the method of the present invention. In particular, there is a subsea pipeline 10 that has a damaged section 12. The subsea pipeline 10 generally rests upon the sea floor 14. It can be seen that the damaged section 12 of the pipeline 10 has a leak 16 therein. Whenever this leak is discovered, it will be necessary to properly repair the pipeline at the subsea location.

In FIG. 1, there is the first lift frame assembly 18 that extends around pipeline 10 at one end of the damaged section 12. A second lift frame assembly 20 extends around the pipeline 10 at an opposite end of the damaged section 12. Similarly, there is a third lift frame assembly 22 that extends around the subsea pipeline 10 in spaced relationship to the first lift frame assembly 18. A fourth lift frame assembly 24 is positioned over the subsea pipeline 10 in spaced relationship to the second left frame assembly 20. The lift frame assemblies 18, 20, and 24 are designed so as elevate subsea pipeline 10, along with a damaged section 12, a desired distance above the sea floor 14.

In normal situations, the pipeline 10 will extend along the sea floor 14. In certain circumstances, over time, the pipeline 10 will tend to be embedded into the sea floor 14. As such, in order to repair the damaged section 12, it will be necessary to lift the subsea pipeline 10 a distance above the sea floor 14. This will allow for the ability to properly cut the damaged section 12 from the pipeline 10 and to install the system of the present invention so that when the damaged section 12 is removed, the pipeline 10 provide for a continuous flow of fluid.

With respect to the lift frame assembly 18, it can be seen there is a base 26 suitable resting on the sea floor 14. A frame 28 is connected to base 26 and extends upwardly from the base 26. The frame 28 extends upwardly and over the top of the subsea pipeline 10. A clamping member is connected to the frame 28. As will be described hereinafter, the clamping member 30 extends around at least a portion of the outer diameter of the subsea pipeline 10. A suitable actuator 32 can be employed so as to cause the clamping member 30 to move downwardly so as to grasp the subsea pipeline 10 and to move upwardly so as to raise the subsea pipeline 10 for a desired distance. A guide shoe assembly 34 is also provided by the first lift frame assembly 18. The guide shoe assembly 34 is positioned at the base 26 and defines a channel suitable for allowing the subsea pipeline 10 to extend therethrough. As will be described hereinafter, there will be a first guide shoe and second guide shoe in spaced relationship to each other. The guide shoes of the guide shoe assembly 34 have a suitably angled upper surface and lower surface so as to allow the guide shoe assembly 34 to be lowered so as to properly reside over the subsea pipeline 10 and to centralize the subsea pipeline 10 in a suitable position whereby the subsea pipeline 10 will be positioned directly under and aligned with the clamping member 30 and the actuator 32. The base 26 will have an open area so as to allow the subsea pipeline 10 to extend below the frame 28. Each of the other lift frame assemblies 20, 22, and 24 will have a construction similar to that of the first lift frame assembly 18.

Figure 2:
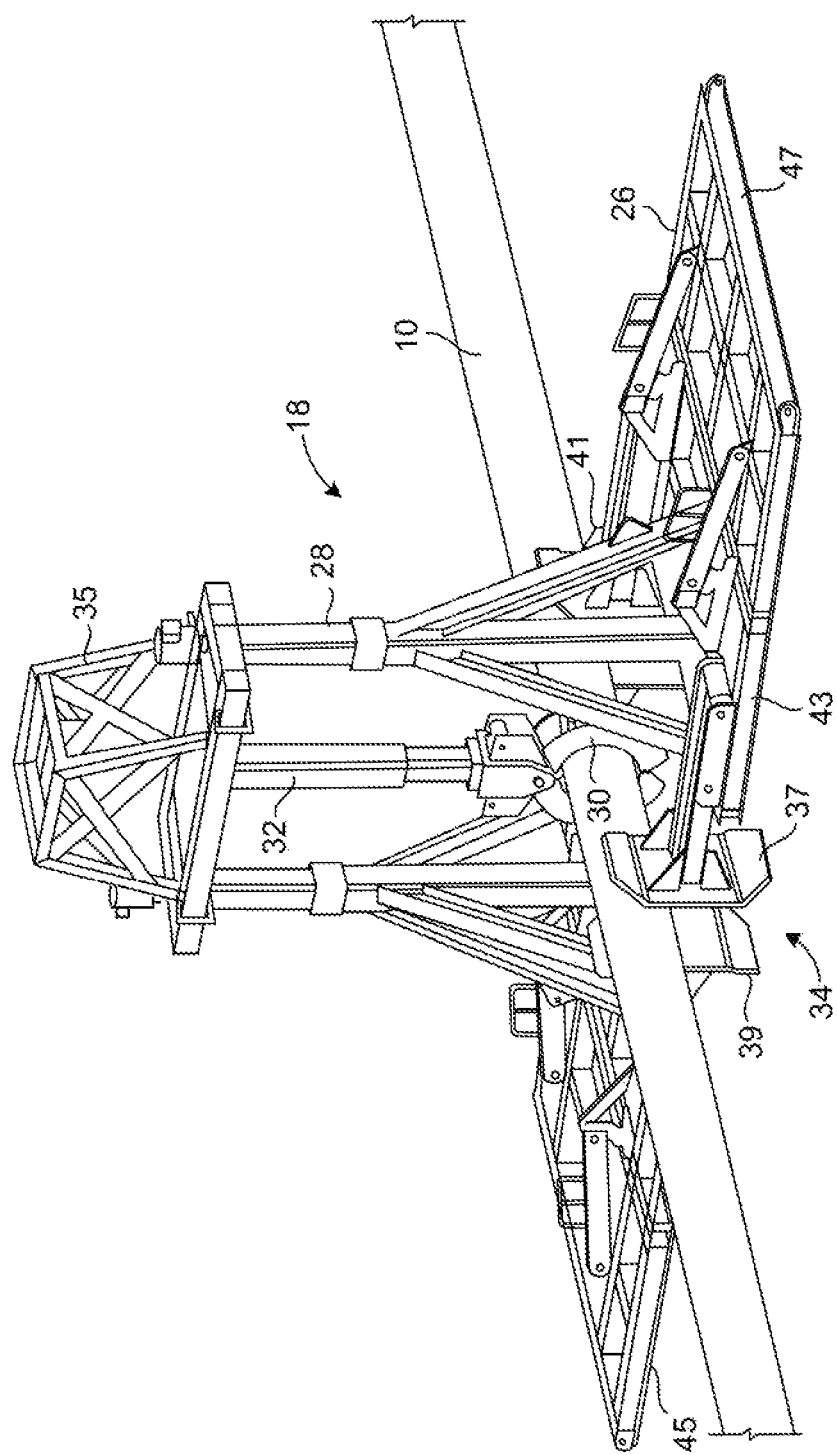
FIG. 2 is a perspective view of the lift frame assembly used for lifting and aligning the subsea pipeline.

FIG. 2 is a detailed view of the first lift frame assembly 18. The first lift frame assembly 18 includes a base 26 that lies directly upon an upper surface of the sea floor 14. The frame 28 extends upwardly from the base 26 and over the top of the subsea pipeline 10. A superstructure 35 is formed on the frame 28 and extends above the top of the pipeline 10. The superstructure 35 will support an actuator 32 therefrom. The superstructure 35 can include the necessary hydraulic connections whereby the actuator 32 can be utilized so as to raise and lower the clamp 30. The actuator 32 is connected to the clamp 30 so as to raise and lower the clamp 30. In FIG. 2, it can be seen that the clamp 30 extends around at least a portion of the outer diameter of the subsea pipeline 10. The actuator 32 allows the clamp 30 to be secured to or released from the subsea pipeline 10.

In FIG. 2, the guide shoe assembly 34 is connected to the base 26. The guide shoe assembly 34 includes a first guide shoe 37 and a second guide shoe 39. The first guide shoe 37 is in spaced relationship to the second shoe 39. The subsea pipeline 10 extends through the space between the guide shoes 37 and 39. Each of the guide shoes 37 and 39 includes an outwardly angled upper surface, a planar middle surface and an outwardly angled lower surface. The angled surfaces serve to facilitate the ability of the lift frame assembly 18 to be placed over the subsea pipeline 10. The upper angled surfaces serve to assure that the subsea pipeline 10 is properly centered below the frame 28 and below the actuator 32 and clamp 30. Another guide shoe assembly 41 is provided at the opposite side of the base 26 from the guide shoe assembly 34. The second guide shoe assembly 41 also serves to assure that the subsea pipeline 10 is properly aligned beneath the frame 28.

The base 26 includes a central panel 43 that supports the frame 28 thereabove. The central panel 43 is slotted so as to allow the lift frame assembly 18 to be placed over the subsea pipeline 10. The central portion 43 of the base 26 also supports the first guide shoe assembly 34 and the second guide shoe assembly 41. The base 26 also includes outwardly extending sections 45 and 47 that are hingedly connected to the central panel 43. As such, the outer sections 45 and 47 can be suitably deployed when lift frame assembly 18 is placed upon the sea floor 14.

Figure 3:
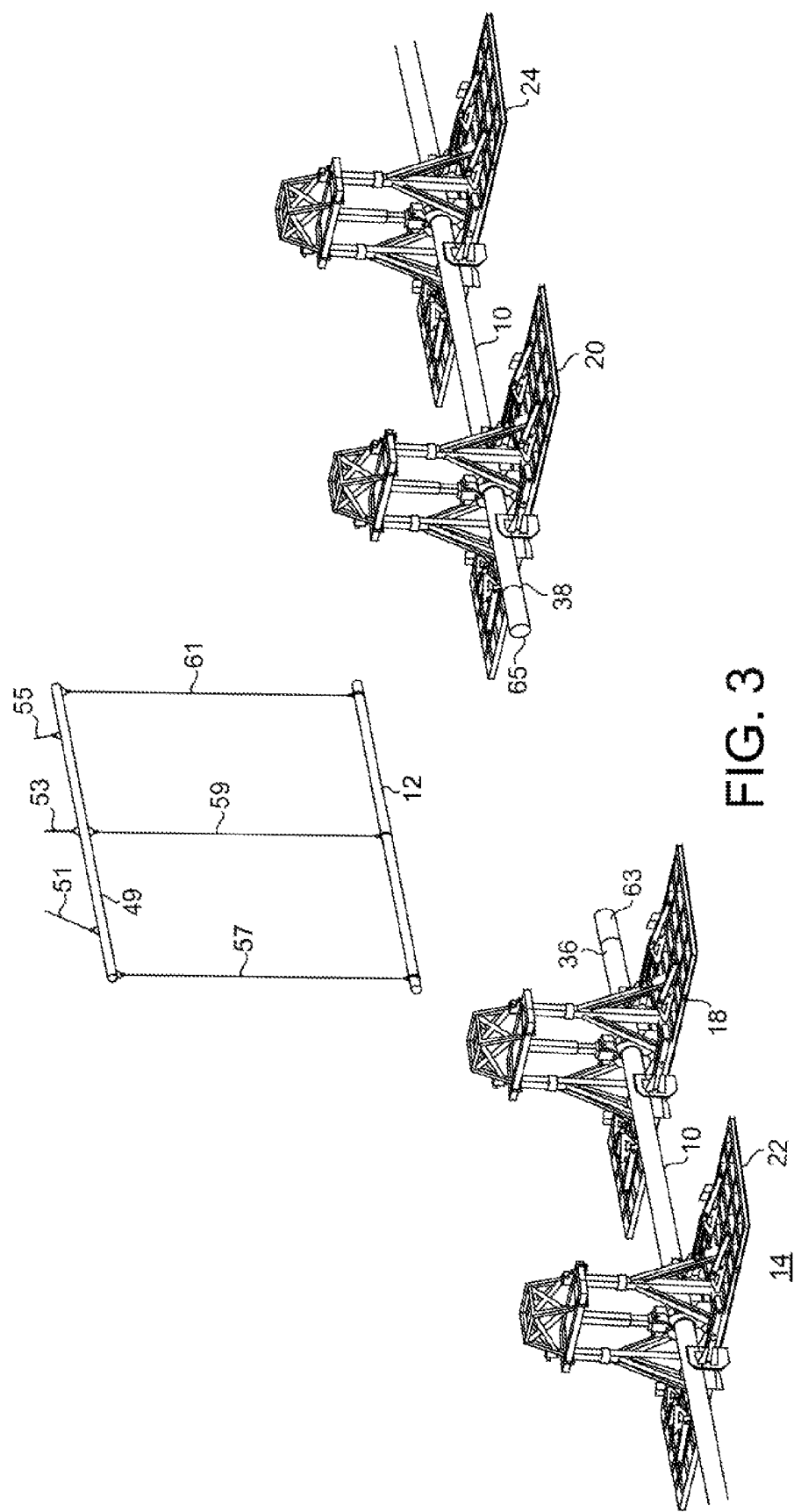
FIG. 3 is a perspective view showing the damaged section of pipeline as removed from the subsea pipeline.

FIG. 3 shows that the damaged section 12 has been removed from the subsea pipeline 10. As such, the subsea pipeline 10 has been cut at a first location 36 adjacent to the first lift frame assembly 18. The damaged section 12 of the pipeline 10 has also been cut at a second location 38 adjacent to the second lift frame assembly 20. The damaged section 12 of pipeline 10 can be suitably cut from the remaining pipeline 10 by a saw deployed by an arm of the ROV. The use of such saws in association with ROVs is well known in the prior art. It is only necessary for the saw to cut through the walls of the subsea pipeline 10 at the first location 36 and the second location 38. In this configuration, the subsea pipeline 10 is configured for connection to the messenger line assemblies and to the jumper.

In FIG. 3, it can be seen that the damaged section 12 of pipeline 10 is being removed from the sea floor 14 through the use of a lifting bar 49. Lifting bar 49 has hoist lines 51, 53 and 55 connected thereto so as to extend ultimately to the surface of the body of water. Several lines 57, 59 and 61 extend downwardly from the lifting bar 49 and are joined to the damaged section 12 of pipe. As such, the damaged section of pipe 12 can be removed from the sea floor 14. It should be noted that the ROV can utilize certain known tools so as to connect the lines 57, 59 and 61 to the damaged section 12 of pipeline 10. A first stopper 63 is inserted into the subsea pipeline 10 at the first location 36. The first stopper 63 can be inserted into the cut end of the pipeline 10 at the first location 36 in a deflated mode. Similarly, a second stopper 65 can be inserted into the cut end of the pipeline 10 at the second location 38. The stopper can be suitably inflated with a low pressure/high volume pump or with an accumulator bottle. The inflation of the stoppers 63 and 65 will continue until no-seepage is observed from the pipeline 10. Suitable mechanisms can be employed so as to prepare the ends of the pipeline 10 at the locations 36 and 38. In particular, these ends of the pipeline 10 can be suitably bevel cut with a pipe end prep beveling tool. The heading/inclination angle of the ends of the pipeline 10 can be surveyed so as to properly set up the pipeline end termination.

Figure 4:
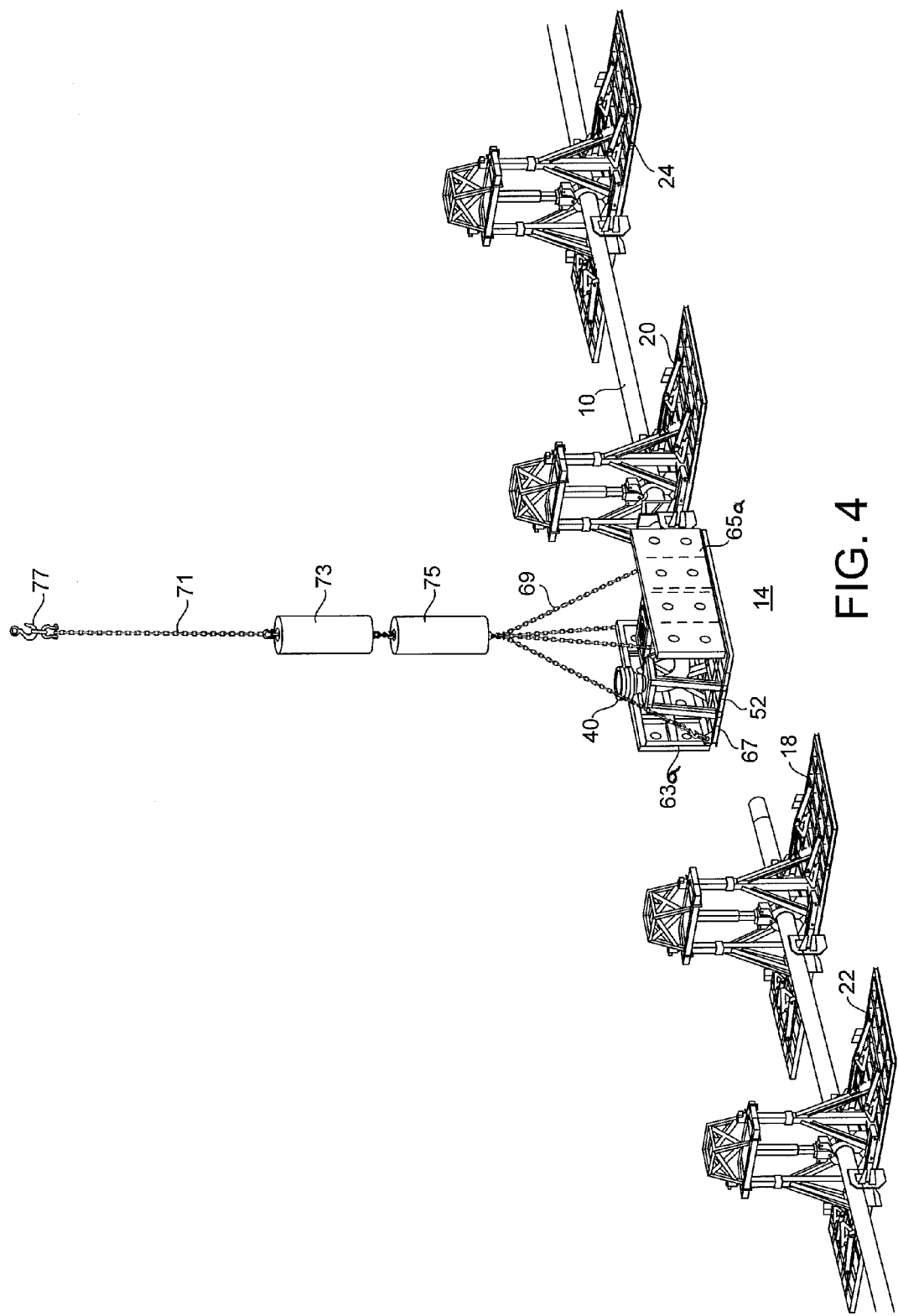
FIG. 4 shows a first step the installation of the messenger line assembly onto the cut location of the subsea pipeline.

FIG. 4 shows how a first messenger line assembly 40 is positioned for connection to the pipeline 10. In FIG. 4, it can be seen that the first messenger line assembly 40 is positioned on a base plate 52. The base plate 52 has hinged sides 63a and 65a. The hinged sides 63a and 65a are deployed upwardly in an orientation generally transverse to the central section 67 of the base plate 52. The base plate 52 is connected by lines 69 to a deployment line 71. Deployment line 71 includes buoyancy cans 73 and 75 thereon. Buoyancy cans 73 and 75 serve to counteract the weight of the messenger line assembly 40 so that the messenger line 40 can be easily deployed in a location adjacent to the cut end of the pipeline 10. A shackle 77 is connected to the upper end of the deployment line 71 for a securement to a proper hoisting system. The messenger line 40 is suitably launched from a vessel on the surface of the body of water. The pipeline end termination will be set at a corresponding heading and inclination angle on the surface of the body of water. The messenger line assembly 40 is launched into the water and then lowered to the sea floor 14. The messenger line assembly 40 can be connected so as to reside outside of the stopper 65.

Figure 5:
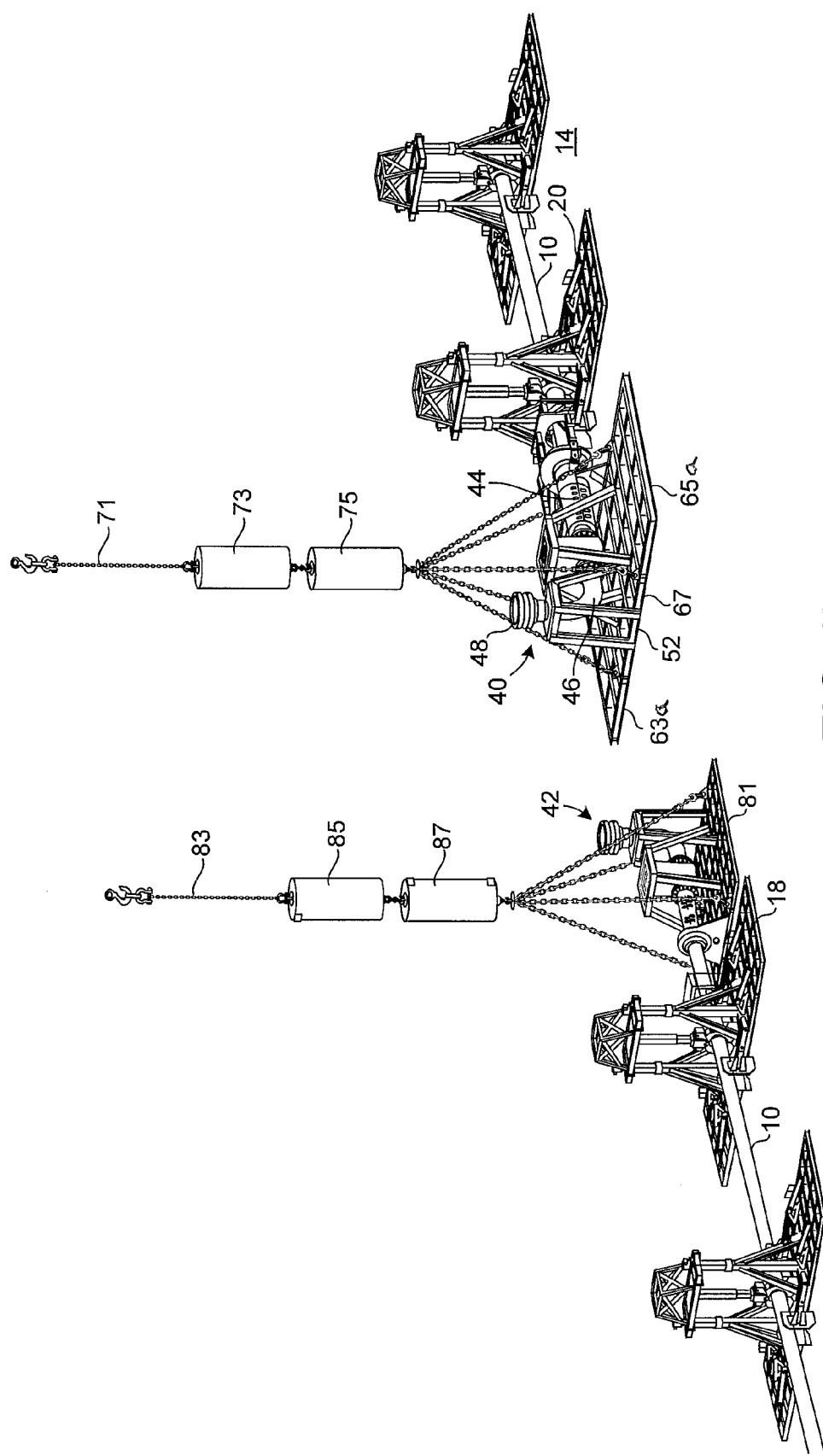
FIG. 5 is a perspective view showing the messenger line assemblies as connected to the cut ends of the subsea pipeline.

FIG. 5 illustrates how each of the messenger line assemblies 40 and 42 are positioned adjacent to the cut end of the pipeline 10 at the first location 36 and at the second location 38. The base plate 52 of the first messenger line 40 is positioned so that the sides 63a and 65a are deployed so as to be coplanar with the central section 67. The messenger line assembly 40 is secured to the cut end of the pipeline 10 adjacent to the second lift frame assembly 20. As will be described hereinafter, the messenger line assembly 40 includes a grip seal connector 44 and a pipe 46 positioned above the base plate 52. The grip seal connector 44 is of a type known in the prior art. A suitable mechanism, to be described hereinafter, will engage with the grip seal connector 44 so as to cause an end of the grip seal connector 44 to be positioned over the cut end of the pipeline 10. The pipe 46 is connected to an opposite end of the grip seal connector 44. As will be described hereinafter, the pipe 46 has a horizontal portion and a vertical portion. The vertical portion extends upwardly so as to terminate at a hub 48. Once the base plate 52 of the messenger line assembly 40 is properly positioned, the deployment line 71 and its associated buoyancy cans 73 and 75 can be released from the base plate 52 and the messenger line assembly 40.

FIG. 5 shows that the second messenger line assembly 42 is supported upon a base plate 81. The base plate 81 and the messenger line assembly 42 are illustrated as lowered to the sea floor 14 by way of another deployment line 83. Buoyancy cans 85 and 87 are connected along the deployment line 83 to facilitate the lowering of the second messenger line assembly 42 to its desired location adjacent to the first lift frame assembly 18 and to the cut end of the pipeline 10. The second messenger line assembly 42 has a configuration similar to that of the first messenger line assembly 40. As such, the messenger line assemblies of the present invention can be standardized so as to conform with the requirements for the repair of pipeline 10.

Figure 6:
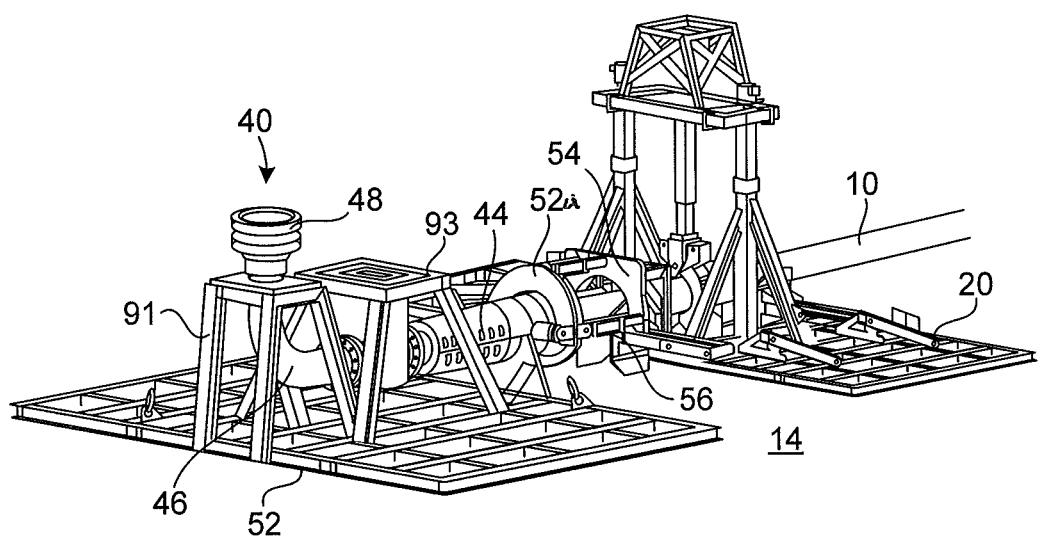
FIG. 6 is a perspective view showing the messenger line assembly as establishing the proper connection between the messenger line assembly and the subsea pipeline.

Referring to FIG. 6, there is shown, in greater detail, the manner in which the first messenger line assembly 40 can be connected to the pipeline 10. The first messenger line assembly 40 has base plate 52 residing on the sea floor 14. The base plate 52 can be in the nature of a mud plate so as to allow the messenger line assembly 40 to assume a proper orientation relative to the sea floor 14. The second lift frame assembly 20 is illustrated as positioned properly over the pipeline 10 so as to align the pipeline 10 with the first messenger line assembly 40. The pipeline 10 is suitably elevated by the lift frame assembly 20 in the manner described herein previously. The first messenger line 40 has a grip seal connector 44 extending horizontally above the base plate 52. A pipe 46 is connected at one end to the grip seal connector 44. The pipe 46 is in the nature of an elbow that has a horizontal portion and a vertical portion. A hub 48 is formed at the end of the vertical portion opposite the grip seal connector 44. A suitable frame structure 91 extends upwardly from the base plate 52 so as to support the grip seal connector 44 and the pipe 46 in a proper orientation. There is valve assembly 93 positioned above the base plate 52 and cooperative in the fluid passageway between the pipe 46 and the grip seal connector 44 so as to allow for the opening and closing of a valve within the fluid passageway. Suitable ROVs can be utilized so as to open and close the valve.

In FIG. 6, it can be seen that there is a hydraulic yoke 52a that is arranged over the end of the grip seal connector 44. The yoke has a guide 54 that extends over and around the cut end of the pipeline 10. A hydraulic actuator 56 is connected to the yoke 52a and to the guide member 54. In actual use, the grip seal connector 44 will have a flange extending radially outwardly therefrom. The yoke 52a will bear against this flange. When the actuator 56 is suitably actuated, the yoke 52a will draw the end of the grip seal connector 44 in a direction toward the cut end of the pipeline 10. With further movement, the open end of the grip seal connector 44 will reside over the cut end of the pipeline 10 so as to establish a fluid connection therewith. The grip seal connector 44 is of a type that is known in the prior art for the purpose of connecting one pipe to another pipe. The mechanism of the present invention for connecting the grip seal connector 44 to the subsea pipeline 10 is not known in the prior art. Through the use of the yoke 52a and the actuator 56, a permanent connection is established between the messenger line assembly 40 and the pipeline 10.

Figure 7:
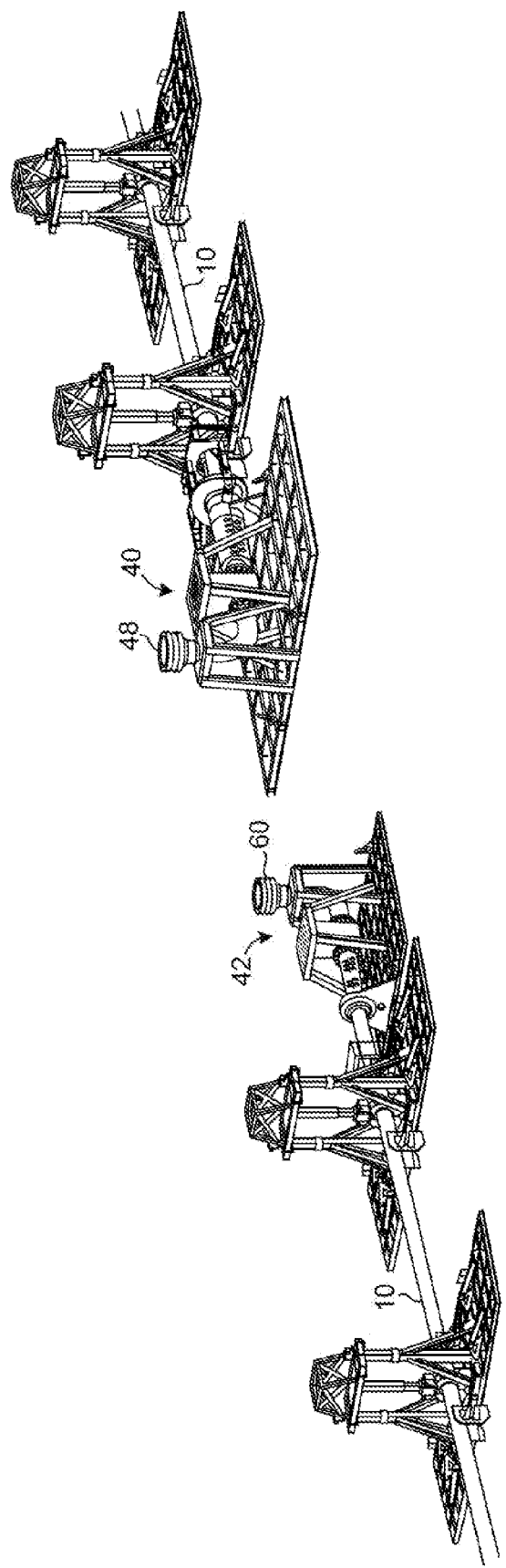
FIG. 7 is a perspective view showing the connection of the messenger line assemblies with the subsea pipeline.

FIG. 7 shows that the first messenger line assembly 40 is connected to the end of the pipeline 10. Similarly, the second messenger line assembly 42 is connected to the cut end of the pipeline 10. As such, the hub 48 of the first messenger line assembly 40 is positioned so as to face upwardly. Similarly, the hub 60 is positioned at the end of the pipe so as to be in a position for connection to the jumper. In this position, the hydraulic stoppers, described herein previously in connection with FIG. 3, can be released. Suitable mechanisms can be connected to the hydraulic stoppers 63 and 65. As such, a hose that is connected to the hydraulic stoppers 63 and 65 can be suitably cut so that the hydraulic pressure therein is released. The deflated stopper can then be removed in a conventional manner from the interior of the pipeline. For example, a line can be connected to the hydraulic stopper and extends through the grip seal connector 44 and the pipe 46 of the messenger line assembly 40. The ROV can then grip this line so as to pull the stopper from the interior of the pipeline. The valve 93 can be suitably closed thereafter so as to prevent any seepage into the subsea environment. Various other techniques can be employed so as to allow for the deflation of the hydraulic stoppers.

Figure 8:
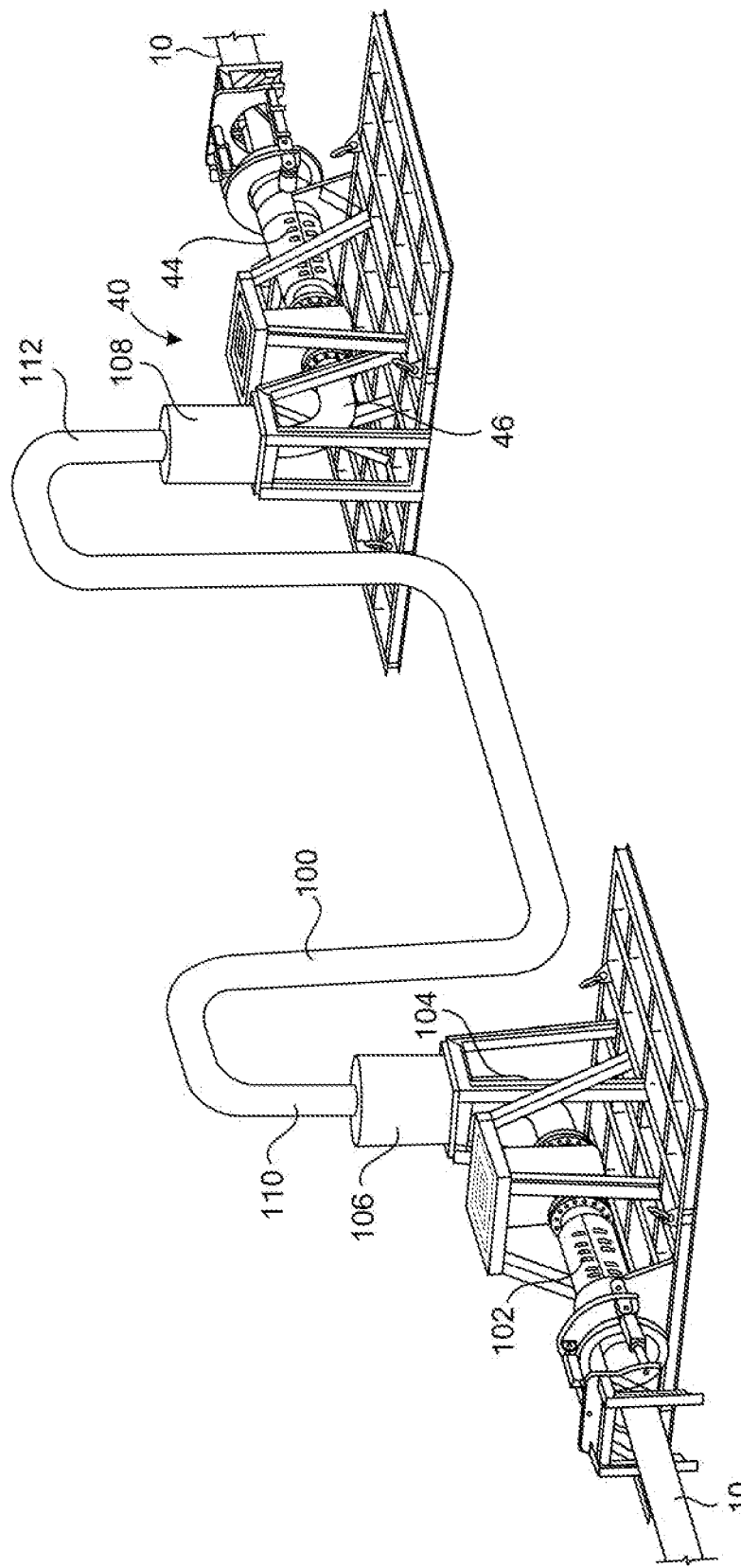
FIG. 8 is a perspective view showing the final installation of the repaired subsea pipeline.

FIG. 8 shows how the jumper 100 is connected the first messenger line assembly 40 and to the second messenger line assembly 42. In particular, in FIG. 8, it can be seen that the grip seal connector 44 is properly affixed to the cut end of the pipeline 10. The pipe 46 is connected to the grip seal connector 44 and extends upwardly. Similarly, the grip seal connector 102 of the second messenger line assembly 42 is also connected to a cut end of the pipeline 10. A pipe 104 is joined to the grip seal connector 102 and extends upwardly therefrom. The jumper 100 has a connector 106 at one end thereof. Connector 106 is proper joined to the hub of the pipe 104 of the second messenger line assembly 42. There is another connector 108 at the opposite end of the jumper 100 that is connected over the hub 48 of the pipe 46. The orientation of the respective pipes 46 and 104 allows the jumper 100 to be easily connected thereto. Since the hubs of the pipes 46 and 104 face upwardly, it is only necessary to lower the jumper 100. The connectors 106 and 108 have suitable mechanisms for automatically connecting with the respective hubs. As such, the joinder of the messenger line assemblies 40 and 42 is easily accomplished. It is not necessary to align a horizontal pipe with any connectors at the cut end of the pipeline 10.

The jumper 100 has a generally M-shaped configuration. This establishes a unique flow pattern and allows for the easy joinder of the connectors 106 and 108 with the respective hubs. The first connector 106 is joined to a vertical portion 110 at the ends of the jumper 100. Similarly, the connector 108 is joined to another vertical portion 112 of the jumper 100. Because of the nature of this M-shaped jumper 100, any offsets between the orientation of the messenger line assemblies 40 and 42 can be easily remedied. The jumper 100 allows for a proper orientation with respect to flow of the pipeline 10.

In normal use, the jumper 100 is constructed onshore. The jumper will be measured between the hubs of the messenger line assemblies 40 and 42. The measurement data associated these hubs allows the jumper to be properly manufactured onshore. An ROV can move the jumper to its desired location for installation.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A method for repairing a damaged section of a subsea pipeline section, the method comprising:
    forming a first lift frame assembly in which a frame is secured to a base and extends upwardly therefrom, said frame having a clamp extending downwardly from said frame, said clamp suitable for extending around a portion of an outer diameter of the subsea pipeline, said clamp having an actuator thereon suitable for moving said clamp upwardly or downwardly;
    affixing a first guide shoe and a second guide shoe adjacent opposite ends of said frame of said first lift frame assembly, said first guide shoe and said second guide shoe defining a channel extending through said base of said frame, each of said first and second guide shoes being in a fixed position and having an opening at a bottom thereof that is wider than a width of an opening at a center thereof;
    forming a second lift frame assembly in which another frame is secured to another base and extends upwardly therefrom, said another frame having another clamp extending downwardly therefrom, said another clamp suitable for extending around another portion of the outer diameter of the subsea pipeline, said another clamp having an actuator thereon suitable for moving said another clamp upwardly or downwardly;
    placing said first lift frame assembly onto the subsea pipeline at a first location such that the subsea pipeline is guided through the openings at the bottoms of said first and second guide shoes so as to reside at the center of the first and second guide shoes;
    placing said second lift frame assembly onto the subsea pipeline at a second location;
    grasping the subsea pipeline by said clamp and said another clamp of said first and second lift frame assemblies;
    lifting the subsea pipeline by moving said clamp and said another clamp upwardly such that the subsea pipeline is raised above a floor of the sea;
    cutting the damaged section adjacent said first location of the subsea pipeline;
    cutting the damaged section adjacent said second location on the subsea pipeline;
    removing the damaged section from the subsea pipeline;
    affixing a first messenger line assembly to the subsea pipeline at said second location;
    affixing a second messenger line assembly to the subsea pipeline at said first location; and
    fastening a jumper line to said first messenger line assembly and to said second messenger line assembly.

2. The method of claim 1, further comprising:
    installing a stopper onto the subsea pipeline at the first location;
    inflating the stopper so as to close an interior of the subsea pipeline at the first location;
    deflating the stopper so as to define a fluid passageway between the subsea pipeline and said first messenger line assembly.

3. The method of claim 2, further comprising:
    installing another stopper onto the subsea pipeline at the second location;
    inflating the stopper so as to close an interior of the subsea pipeline at the second location; and
    deflating the stopper so as to define a fluid passageway between the subsea pipeline and said second messenger line assembly.

4. The method of claim 1, further comprising:
    lowering said first messenger line assembly toward the first location of the subsea pipeline; and
    lowering said second messenger line assembly toward the second location of the subsea pipeline.

5. The method of claim 1, said first messenger line assembly having a grip seal connector extending therefrom, the method further comprising:
    positioning a yoke over said grip seal connector; and
    pulling said grip seal connector with said yoke over the subsea pipeline at said first location.

6. The method of claim 1, said first messenger line assembly having a connector at one end thereof, said second messenger line assembly having a connector at one end thereof, the method further comprising:
    affixing one end of said jumper to said connector at said one end of said first messenger line assembly; and
    affixing an opposite end of said jumper to said connector at said one end of said second messenger line assembly so that a continuous flow line is established between said first and second locations of the subsea pipeline.

7. The method of claim 1, each of said first and second messenger line assemblies having a valve, the method further comprising:
    closing the valve.

8. The method of claim 1, further comprising:
    forming said first messenger line assembly so as to have a bottom plate with a frame upwardly therefrom, said frame supporting a pipe and a grip seal connector, said grip seal connector connected to said pipe thereof, said grip seal connector having an end with a diameter suitable for fitting over the subsea pipeline at said first location, the pipe having a connector at an end opposite said grip seal connector.

9. The method of claim 1, further comprising:

releasing the subsea pipeline by said first lift frame assembly; and lifting said first lift frame assembly away from the subsea pipeline.

* * * * *